United States Patent [19]

Hauert

[11] Patent Number: 5,021,632

[45] Date of Patent: Jun. 4, 1991

[54] LASER BEAM MACHINING HEAD

[75] Inventor: Ulrich Hauert, Schnottwil, Switzerland

[73] Assignee: Lasag AG, Thun, Switzerland

[21] Appl. No.: 576,844

[22] Filed: Sep. 4, 1990

[30] Foreign Application Priority Data

Sep. 5, 1989 [CH] Switzerland ............. 03225/89

[51] Int. Cl.$^5$ .............................. B23K 26/02
[52] U.S. Cl. ...................... 219/121.83; 219/121.62
[58] Field of Search ........... 219/121.83, 121.6, 121.85, 219/121.61, 121.62; 372/701

[56] References Cited

U.S. PATENT DOCUMENTS 4,711,985  12/1987  Wilkerson ............... 219/121.62
4,733,048   3/1988  Clayton .................. 219/121

FOREIGN PATENT DOCUMENTS 0116807  8/1984  European Pat. Off. .

Primary Examiner—C. L. Albritton
Attorney, Agent, or Firm—Griffin Branigan & Butler

[57] ABSTRACT

A tool designed to operate in a substantially vertical position without contact with a workpiece such as a laser beam machining head comprising an operating member and a support for this member rigidly connected to a machine frame. This operating member comprises mounting means resting at at least three points on a support, this tool also has abutment means impeding displacement of the operating member in a plane substantially perpendicular to its axis (W, W').

8 Claims, 3 Drawing Sheets

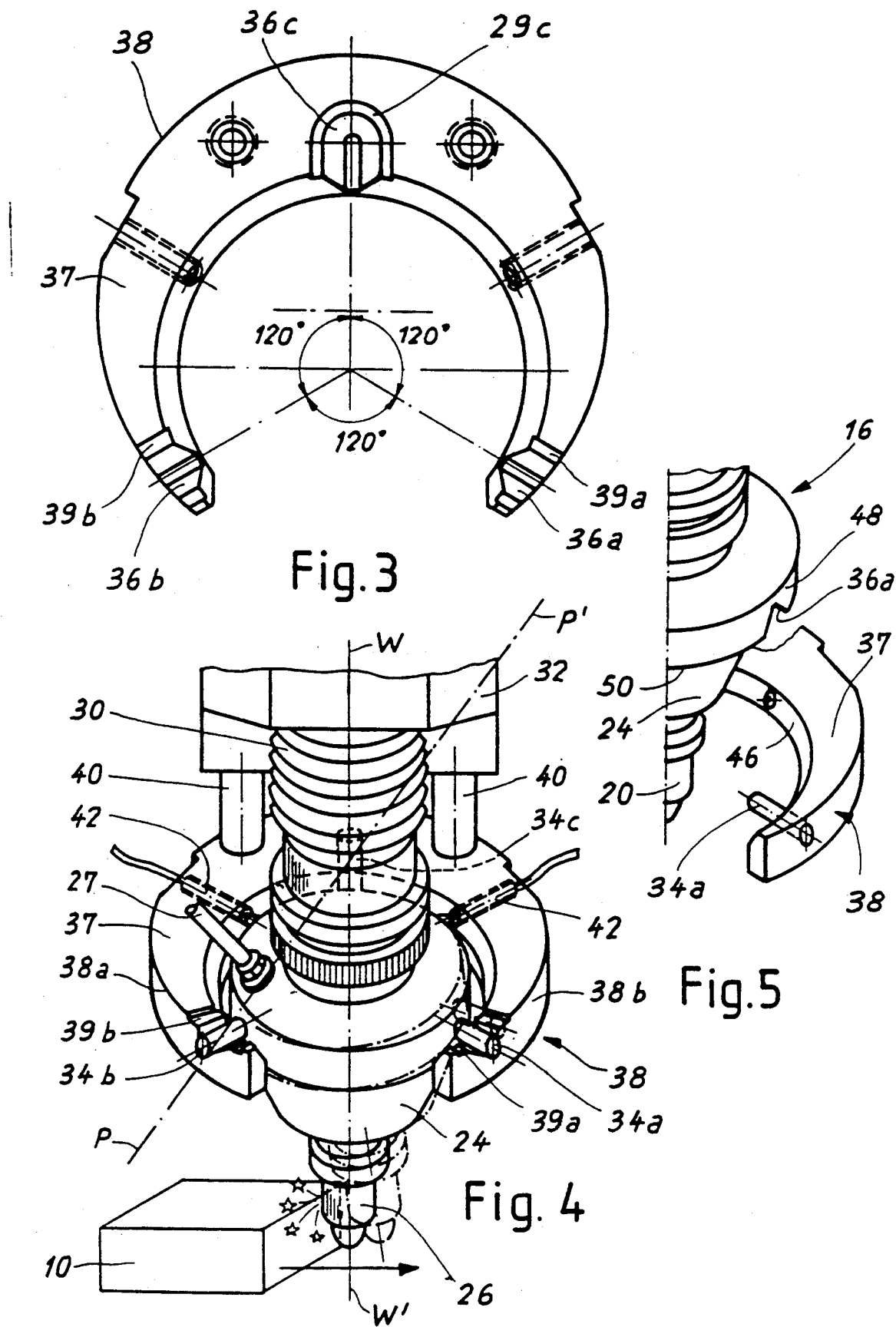

LASER BEAM MACHINING HEAD

FIELD OF THE INVENTION

The invention relates to a tool for working in a substantially vertical position without contact with a piece to be machined and/or checked. In particular the invention relates to a laser beam machining head capable of being deflected without risk of damage when it encounters an obstacle, for example as a result of a machine programming error.

BACKGROUND OF THE INVENTION

Tools permitting machining and/or checking without contact with a workpiece, such as laser beam machining heads, have fragile operating parts which need to be protected in the event of shock.

In the case of a laser beam machining head the operating parts are understood to mean the focussing means made up of one or more lenses located in the head and associated with a machining nozzle.

It is known that, if a head of this type is to function correctly, i.e. for the machining to be carried out efficiently, it is necessary to adjust the point of convergence of the beam, on the one hand in relation to the workpiece and, on the other hand, in relation to the orifice of the nozzle.

This adjustment is a delicate operation and is of only very moderate stability if the head strikes an obstacle. If, for example, the nozzle only strikes against the workpiece, for example because of an error in manipulating or programming the machine, this can cause misalignment of the axis of the laser beam with the orifice of the nozzle (the diameter of which is of the order of a few millimeters), thus rendering the head useless until the nozzle is readjusted in relation to the focussing means, possibly necessitating replacement of the nozzle.

As stated above, the operation of readjusting the focussing means in relation to the nozzle is delicate and has to be carried out by highly skilled personnel.

As a result, the slightest shock between the head and an obstacle involves high manpower costs on the one hand and/or material costs on the other hand.

To overcome these problems a system is known which uses shock detectors designed to stop any movement of the head in respect of the piece or frame in the event of a shock.

A system of this type is effective if the movements of the head in relation to the piece or the frame are slow, but it does not make it possible to react sufficiently quickly if the head strikes an obstacle at high speed, with the result that there is great danger of damage to the head which is rigidly associated with its support.

DESCRIPTION OF THE PRIOR ART

In EP-A-0 030 754 there is disclosed mechanical means for protecting a laser beam machining head against shocks. In this case the head is pivotally mounted with the aid of a plurality of springs extending along the axis of the head on a support member. This pivoting link head/support thus enables the head to tilt and to stop the machine when it encounters an obstacle so as to avoid any violent shock between the head and an external component.

However, this machining head has disadvantages in that it is complicated and not very easy for an unskilled operator to use.

If the focussing lenses and/or the nozzle have to be changed for any reason to carry out a different form of machining, or if the operating part of the machining head has to be temporarily replaced by an observation device, such as binoculars, it is necessary to dismantle the head, to change the lenses and/or the nozzle, to re-assemble and adjust the lenses in relation to the nozzle and then to re-assemble everything on the support member. Moreover, all these operations have to be carried out by skilled personnel, resulting in substantial operating costs.

In addition, EP-A-0 116 807 discloses a device corresponding to the preamble of claim 1. However, the cavities receiving the studs are provided in the base of narrow, deep grooves, thereby preventing the rapid and effective release of the studs from the cavities in the event of a violent shock. This is particularly the case when the shock occurs along a direction perpendicular to the axis of the device.

OBJECTS OF THE INVENTION

It is thus a main object of the invention to overcome the disadvantages of the above-mentioned prior art by providing a tool which is designed to work in a substantially vertical position and without contact with a workpiece and which comprises a simple and effective anti-shock device and that, in addition, can be easily changed by just one operator without need for special adjustment.

It is an object of the invention to provide a tool which is designed to operate in a substantially vertical position without contact with a workpiece and which comprises a head constituting at least partially one operating part of the tool, and a support for this head, rigidly mounted on a machine frame, said workpiece comprising 3 studs resting in 3 cavities provided in the support to hinder displacement of the head in a plane substantially perpendicular to the axis of the head.

BRIEF SUMMARY OF THE INVENTION

In accordance with the invention the V-shaped recesses extend radially along competing axes, opening into the proximity of the upper surface of the support.

Owing to these characteristics the head of the tool is always precisely positioned on the support without, however, being rigidly connected therein. The head can therefore easily be deflected or tilted should it strike against an obstruction, regardless of the force and/or the direction of the resulting shock.

The absence of any fixed connection between the head and the support results in the great advantage that it is possible to replace the head rapidly and without adjustment (the head having previously being adjusted) because the head repositions itself automatically in the correct location on the support.

BRIEF DESCRIPTION OF THE DRAWINGS

Other advantages and features of the invention will emerge from the following description of embodiments of the invention given for purposes of example and which are non limiting, with reference to the appended drawings, in which:

FIG. 3 is a view from below showing the support member for the operating part of the head according to the invention, FIG. 4 is a perspective view of the head according to the invention showing the machining head in a deflected position following a lateral shock between the nozzle and a workpiece, and FIG. 5 is a partial view from below showing an embodiment of the connection between the operating part and the support member of the invention.

A detailed description of the tool according to the invention will now be given in the context of application to a laser beam machining head.

It is to be nevertheless understood that the invention is not limited to this application and to the embodiments described or proposed. For example a tool according to the invention may incorporate an ultrasound-emitting control device in its operating part.

DETAILED DESCRIPTION OF THE INVENTION

Figure 1:
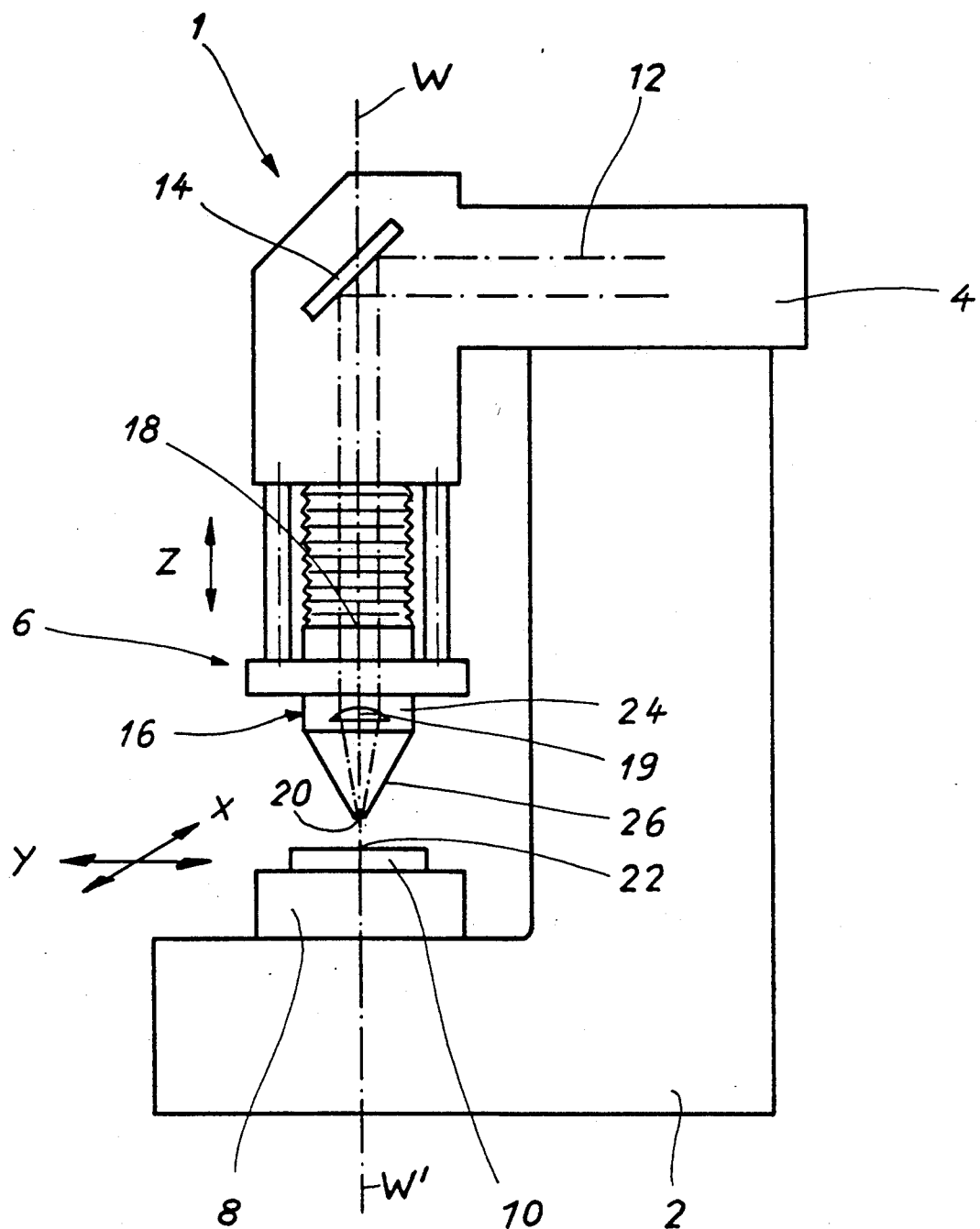
FIG. 1 is a diagrammatic view showing a laser beam machine tool comprising a machining head in accordance with the invention.

Reference is first made to FIG. 1, which shows a laser machine tool designated by the general reference numeral 1.

This machine has a conventional frame 2 provided with a laser source 4, a part 6 constituting the tool and a table 8 on which the workpiece 10 rests. The table and the tool are moveable with respect to one another the movements being controlled by electric motors (not shown) for example in response to a control program.

The table 8 can move in the horizontal plane along the directions X, Y and the tool 6 can move in the vertical direction Z.

A laser source 4 emits a beam 12 which is reflected by a mirror 14 towards the tool 6. This beam 12 enters the operating part 16 of the tool via an inlet orifice 18 and is focussed in the latter in conventional manner, for example by a converging lens 19, to define in the vicinity of an orifice 20 of the tool a working point 22 located on the workpiece 10.

Figure 2:
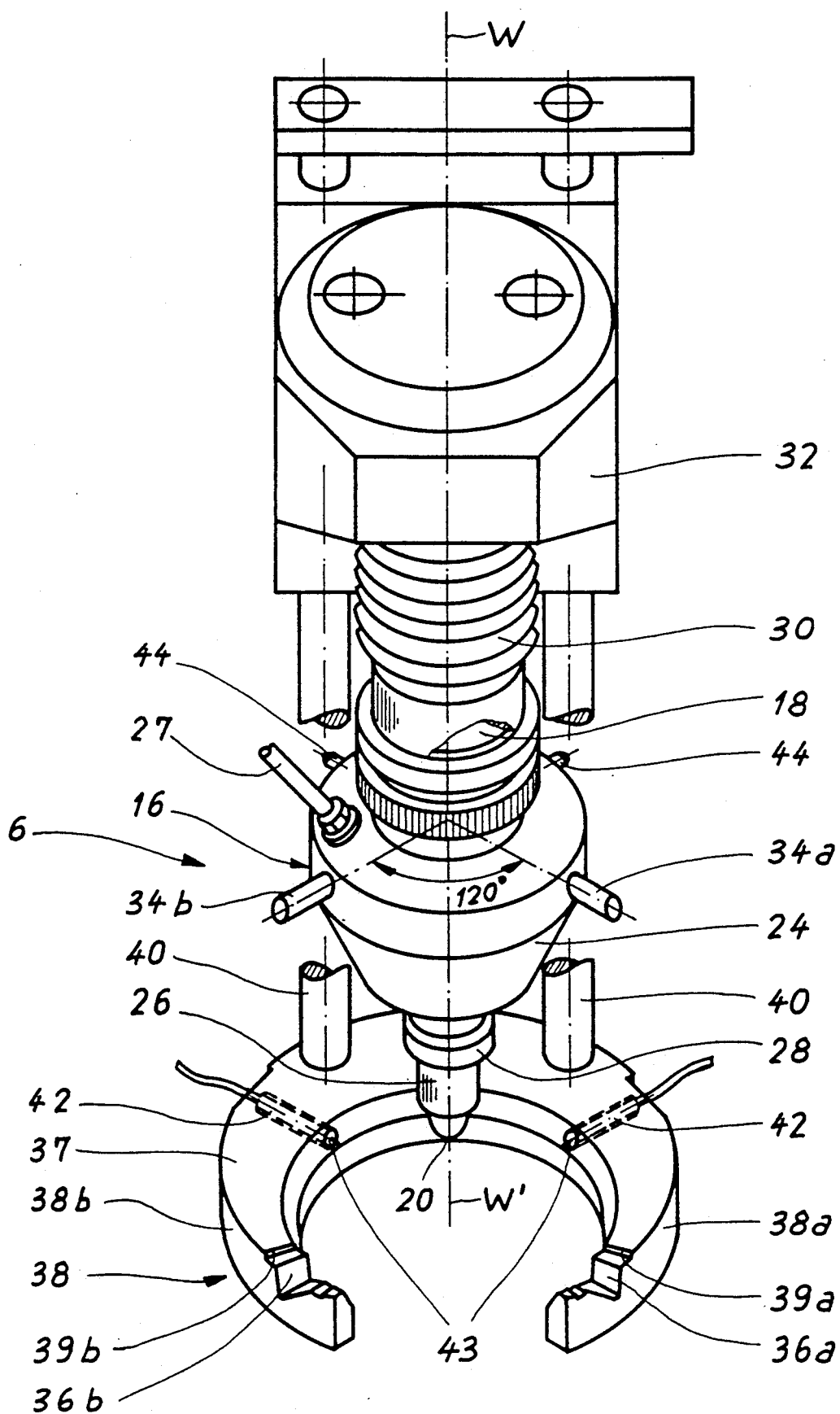
FIG. 2 is an exploded perspective view showing a laser beam machining head according to the invention.

Referring now more particularly to FIGS. 2 and 3, the tool 6 of the invention comprises an operating part 16 which will hereinafter be referred to as the machining head. The machining head 16 comprises a hollow cylindrical body 24 of substantially tapered shape which accommodates the focussing means for the laser beam. This body 24 has, at its upper extremity, a beam inlet orifice 18, in its middle section a regulating nozzle 27 for the machining gas and, at its lower free extremity, an outlet orifice 20 defined by a machining nozzle 26. In this embodiment the machining nozzle 26 is mounted with the help of a threaded bush 28; it is nevertheless understood that the nozzle 26 may be formed integrally with the body 24 of the head 16.

As shown in FIG. 2, the upper extremity comprising the inlet orifice 18 is connected by the intermediary of a bellows 30 to a housing 32 containing the mirror 14 (not shown in this figure).

In addition, the body 24 comprises according to the invention three studs, 34a, 34b and 34c respectively (only two of which are visible in the figures) forming mounting means. These three studs which are for example composed of cylindrical rods, are fixed into corresponding mountings provided in the body 24 in such a way that these studs extend radially therefrom. These studs are preferably staggered at substantially 120° from one another and extend in the same perpendicular plane as the working direction W, W' of the beam.

The studs 34a, 34b, 34c rest in corresponding recesses 36a, 36b, 36c respectively, provided substantially at 120° in relation to the upper part 37 of a support member 38 and extending radially. This support member 38 extends in a plane perpendicular to the axis of the beam and is rigidly connected to the machine frame by way of two columns 40 extending parallel to the body 24 of the head. In the embodiment shown, the support member is of horseshoe shape in order to facilitate positioning the lower part of the head in the support. It is of course understood that differently shaped support members could have been designed, for example a ring-shaped support member.

Thus, when the head rests in the recesses 36a, 36b, 36c, the middle part of the head is located between the two branches 38a, 38b of the support member 38. It will be noted in this connection that the centre of gravity of the head assembly is preferably located below the level of the median plane of the support member 38 in order to confer greater stability to the head, since this latter only rests on the support member by its own weight.

It may be seen from FIGS. 2 and 3 that the recesses 36a, 36b, 36c are not directly engineered in the upper surface of the support member, but rather in the base of the straight grooves 39a, 39b, 39c cut in this surface 37.

The sides of recesses 36a, 36b, 36c connect respectively with the lower surfaces of straight grooves 39a, 39b, 39c. It will be noted that the depth of grooves 39a, 39b, 39c is approximately equal to, or less than, the diameter of the studs 34a, 34b, 36c and that their width is sufficient for the studs, when disengaged from the V-shaped recesses, to be received and supported without being directly blocked by the lateral surfaces of grooves 39a, 39b, 39c.

It is, of course, also possible in a simpler embodiment (not shown) to ensure that the sides of the recesses connect directly with the upper surface 37 of the support.

In order to ensure accurate positioning of the head in the support member and locking of the head in the plane of the support member, the recesses are advantageously in the form of V-shaped recesses with the studs resting against the sides thereof.

In this connection it will be noted that the angle of opening of the V of the recesses, which is in this case typically 60°, determines the force needed to eject the studs from these recesses, this force being inversely proportional to the size of the angle.

The machining head also comprises shock detection means having an outer element such as the workpiece, the table of the machine, or the like. These detection means comprise two mechanical microswitches 42 capable of delivering, if necessary, a signal to stop the machine. As may be seen in FIGS. 2 and 3, these microswitches are mounted in each of the branches 38a, 38b of the support member 38.

These microswitches are arranged between the recesses 36a, 36b, 36c and are angularly staggered in relation to one another by about 120°. Any change in position or displacement of the head 16 during working is consequently detected.

These microswitches are connected to the control circuit of the machine (not shown) and present an operating end 43 cooperating with contact blocks 44 provided opposite these extremities 43 on the body of the head when this is positioned in the support 38.

The operation of the device will now be described with reference to FIG. 4 and, more precisely, in the case of a lateral shock imparted to the machining head by a workpiece.

The head 16 in working position (vertical) rests merely by its own weight on the support element 38 and the piece 10 moves in relation to the head for example in a horizontal plane. If for any reason, such as a machine programming error or manipulating error made by the operator, the nozzle 26 knocks against the workpiece 10, the head tilts and tends to absorb the shock. As shown in a dotted line in FIG. 4, the stud 34a disengages from its recess whilst the two others 34b, 34c form two points of support by which an axis PP' passes about which the head can swing. The displacement of the head causes the opening (or possibly the closing) of one or of both microswitches 42 with the result that the control circuit receives an immediate cut off signal. At this moment the operator can intervene simply by removing the obstacle and replacing the head back in its working position.

It will be noted that advantageously, in the case of a sudden shock, the three studs come out of their respective recesses simultaneously and are retained in the grooves 39a, 39b, 39c with the result that the head does not fall from the support 38.

It will now easily be understood that in the case of the head being struck in a vertical direction, the head lifts up, thereby removing the studs from the recesses and actuating the microswitches.

Finally, reference is made to FIG. 5 which shows a partial view of an embodiment of the pivoting means and of the head support. In this embodiment the support comprises a support element 38 substantially identical in shape to that described in connection with FIGS. 2 to 4. Three studs 34a, 34b, 34c extend radially and in the same perpendicular plane to the axis of the beam as from the inside wall 46 of the support element 38. Here, too, each of the three studs is of course staggered by about 120° in relation to the others.

The mounting means of the head constitute an additional structure by means of which this can rest on the three studs. More precisely, the head comprises a collar 48 or a supplementary ring presenting an annular rest surface 50 in which are provided the three recesses 36a, 36b, 36c. These recesses also distributed about the head extend radially and take the form of a V-shaped recess.

In the embodiments shown, the machining head is preferably vertical, but it will be noted that the head according to the invention may also be used when its working axis (W, W') presents a weak inclination to the vertical axis, typically up to about 30°.

I claim:

1. A tool for working in a substantially vertical position without contact with a workpiece and which comprises a head constituting at least partially an operating part of the tool, a support for this head rigidly connected to a machine frame, said head comprising three studs resting in three cavities provided in the support to impede displacement of the head in a plane substantially perpendicular to the axis (W, W') of the tool, wherein the cavities are V-shaped recesses extending radially and along competing axes and opening into the proximity of the upper surface of the support.

2. A tool according to claim 1, wherein the sides of the recesses connect directly with the upper surface of the support.

3. A tool according to claim 2, wherein the sides of the recesses connect respectively onto the surfaces of the base of grooves provided in the upper surface of the support and the depth of which is approximately equal to or less than the diameter of the studs and the width of which is such that the studs can be disengaged from the recesses and received in these latter without immediate blockage against their lateral walls in the event of a shock against the head.

4. A tool according to claim 1, wherein the support comprises an element having substantially the configuration of a horseshoe.

5. A tool according to claim 1, wherein the studs and the cavities are staggered by 120° C. in respect of one another and are disposed respectively in the same plane.

6. A tool according to claim 1, which comprises in addition shock detection means having an outer element capable of delivering a signal to stop the machine.

7. A tool according to claim 6, wherein the detection means comprise two microswitches.

8. A tool according to claim 1, wherein the head is a laser beam head and which comprises focussing means for the beam.

* * * * *